(12) United States Patent
Lewis et al.

(10) Patent No.: US 7,445,670 B2
(45) Date of Patent: Nov. 4, 2008

(54) FOAMED CEMENT COMPOSITIONS AND ASSOCIATED METHODS OF USE

(75) Inventors: Samuel J. Lewis, Duncan, OK (US); Michael J. Szymanski, Duncan, OK (US); Kristi D. Thacker, Velma, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 164 days.

(21) Appl. No.: 11/699,517

(22) Filed: Jan. 29, 2007

(65) Prior Publication Data

US 2007/0119346 A1 May 31, 2007

Related U.S. Application Data

(62) Division of application No. 10/946,979, filed on Sep. 22, 2004, now Pat. No. 7,191,834.

(51) Int. Cl.
C04B 24/16 (2006.01)

(52) U.S. Cl. .................. 106/724; 106/726; 106/727; 106/823

(58) Field of Classification Search .................. 106/724, 106/726, 727, 823
See application file for complete search history.

(56) References Cited

U.S. PATENT DOCUMENTS

| | | | |
|---|---|---|---|
| 3,306,354 A | 2/1967 | O'Brien |
| 5,133,409 A | 7/1992 | Bour et al. |
| 5,147,565 A | 9/1992 | Bour et al. |
| 5,385,206 A | 1/1995 | Thomas |
| 5,484,019 A | 1/1996 | Griffith |
| 5,588,489 A | 12/1996 | Chatterji et al. |
| 5,591,701 A | 1/1997 | Thomas |
| 5,696,059 A | 12/1997 | Onan et al. |
| 5,711,801 A | 1/1998 | Chatterji et al. |
| 5,897,699 A | 4/1999 | Chatterji et al. |
| 6,063,738 A | 5/2000 | Chatterji et al. |
| 6,202,751 B1 | 3/2001 | Chatterji et al. |
| 6,210,476 B1 | 4/2001 | Chatterji et al. |
| 6,220,354 B1 | 4/2001 | Chatterji et al. |
| 6,227,294 B1 | 5/2001 | Chatterji et al. |
| 6,244,343 B1 | 6/2001 | Brothers et al. |
| 6,273,191 B1 | 8/2001 | Reddy et al. |
| 6,332,921 B1 | 12/2001 | Brothers et al. |
| 6,336,505 B1 | 1/2002 | Reddy |
| 6,340,715 B1 | 1/2002 | Sommer |
| 6,364,945 B1 | 4/2002 | Chatterji et al. |
| 6,367,550 B1 | 4/2002 | Chatterji et al. |
| 6,390,195 B1 | 5/2002 | Nguyen et al. |
| 6,454,004 B2 | 9/2002 | Reddy et al. |
| 6,454,008 B1 | 9/2002 | Chatterji et al. |
| 6,457,524 B1 | 10/2002 | Roddy |
| 6,478,868 B1 | 11/2002 | Reddy et al. |
| 6,500,252 B1 | 12/2002 | Chatterji et al. |
| 6,516,883 B1 | 2/2003 | Chatterji et al. |
| 6,547,871 B2 | 4/2003 | Chatterji et al. |
| 6,555,505 B1 | 4/2003 | King et al. |
| 6,592,660 B2 | 7/2003 | Nguyen et al. |
| 6,619,399 B1 | 9/2003 | Chatterji et al. |
| 6,630,021 B2 | 10/2003 | Reddy et al. |
| 6,662,873 B1 | 12/2003 | Nguyen et al. |
| 6,668,927 B1 | 12/2003 | Chatterji et al. |
| 6,689,208 B1 | 2/2004 | Brothers |
| 6,698,519 B2 | 3/2004 | Nguyen et al. |
| 6,715,553 B2 | 4/2004 | Reddy et al. |
| 6,722,433 B2 | 4/2004 | Brothers et al. |
| 6,722,434 B2 | 4/2004 | Reddy et al. |
| 6,734,146 B2 | 5/2004 | Chatterji et al. |
| 6,739,806 B1 | 5/2004 | Szymanski et al. |
| 6,783,587 B2 | 8/2004 | Sethuraman et al. |
| 6,797,054 B2 | 9/2004 | Chatterji et al. |
| 6,858,566 B1 | 2/2005 | Reddy et al. |
| 6,979,366 B2 | 12/2005 | Chatterji et al. |
| 7,013,975 B2 | 3/2006 | Chatterji et al. |
| 7,040,419 B2 | 5/2006 | Chatterji et al. |
| 7,191,834 B2 | 3/2007 | Lewis et al. |

OTHER PUBLICATIONS

Halliburton brochure entitled "AQF-2 Foaming Agent" dated 1999.
Halliburton brochure entitled "Howco-Suds Surfactant" dated 1999.
Foreign communication from a related counterpart application dated Jul. 7, 2006.
Office Action on U.S. Appl. No. 10/946,979, dated Aug. 29, 2006.
Notice of Publication dated May 31, 2007 from U.S. Appl. No. 11/699,249.

*Primary Examiner*—Paul Marcantoni
(74) *Attorney, Agent, or Firm*—Craig W. Roddy; Baker Botts, LLP

(57) ABSTRACT

A method is provided for reducing the density of a well cement composition for cementing in a subterranean formation. The method comprises providing a cement composition that comprises water and a cement, and then adding an additive comprising an anionic foam stabilizer and an anionic foaming agent or a Zwitterionic foam booster. A gas is added to this mixture to reduce the density. Further, foamed cement compositions and additives for foaming and stabilizing a well cement composition are provided.

23 Claims, No Drawings

FOAMED CEMENT COMPOSITIONS AND ASSOCIATED METHODS OF USE

CROSS-REFERENCE TO RELATED APPLICATIONS

This application is a divisional of U.S. patent application Ser. No. 10/946,979 filed Sep. 22, 2004, now U.S. Pat. No. 7,191,834, entitled "Foamed Cement Compositions and Associated Methods of Use," the disclosure of which is hereby incorporated by reference in its entirety.

BACKGROUND

The present invention relates to subterranean cementing operations and associated methods, and more particularly, to foamed cement compositions that comprise an additive, the additive comprising an anionic foam stabilizer and at least one of an anionic foaming agent or a Zwitterionic foam booster.

Hydraulic cement compositions commonly are utilized in subterranean operations, particularly subterranean well completion and remedial operations. For example, hydraulic cement compositions may be used in primary cementing operations, whereby pipe strings such as casings and liners are cemented in well bores. In performing primary cementing, hydraulic cement compositions may be pumped into an annular space between the walls of a well bore and the exterior surface of a pipe string disposed therein. The cement composition is permitted to set in the annular space, thereby forming an annular sheath of hardened substantially impermeable cement therein that substantially supports and positions the pipe string in the well bore, and that bonds the exterior surface of the pipe string to the walls of the well bore. Hydraulic cement compositions also are used in remedial cementing operations that involve plugging highly permeable zones or fractures in well bores, plugging cracks and holes in pipe strings, and the like.

Cement compositions utilized in subterranean operations may be lightweight to prevent excessive hydrostatic pressure from being exerted on subterranean formations penetrated by the well bore, whereby the formations may be unintentionally fractured. One type of lightweight cement composition is a foamed cement composition, i.e., a cement composition that comprises a gas. In addition to being lightweight, the gas contained in the foamed cement composition improves the ability of the composition to maintain pressure and prevent the flow of formation fluids into and through the cement composition during its transition time, i.e., the time during which the cement composition changes from a true fluid to a set mass. Foamed cement compositions are also advantageous because they have low fluid loss properties and may act to prevent the loss of fluid circulation. Additionally, foamed cement compositions when set have a lower modulus of elasticity than non-foamed cements, which is often desirable as it enables the resultant set cement, inter alia, to resist hoop stresses exerted on the set cement in the annulus.

A foamed cement composition generally may be prepared by mixing a gas, such as air or nitrogen, with the cement composition. Foamed cement composition typically further may comprise a variety of surfactants commonly referred to as "foaming agents" for facilitating the foaming of a cement composition and various other surfactants commonly referred to as "foam stabilizers" for preventing the components of the foamed cement composition from prematurely separating. While a variety of foaming agents and foam stabilizers are well known in the art, problems have been associated with their use. For example, certain foaming agents, such as those consisting of a surfactant of Formula 1, $R—OR')_n—OSO_3—X^+$, and foam stabilizers, such as a glycol of Formula 2, $CH_3—(CH_2CH_2O)_nH$, or a betaine surfactant, may lower the compressive strength of the resultant set cement composition. Furthermore, upon mixing, the foaming agents and foam stabilizers used heretofore with water, gelation may occur, which is undesirable. Moreover, some foaming agents and/or foam stabilizers may have undesirable environmental characteristics and/or may be limited by strict environmental regulations in certain areas of the world.

SUMMARY

The present invention relates to subterranean cementing operations and associated methods, and more particularly, to foamed cement compositions that comprise an additive, the additive comprising an anionic foam stabilizer and at least one of an anionic foaming agent or a Zwitterionic foam booster.

In one embodiment, the present invention provides a method of cementing in a subterranean formation that comprises providing a foamed cement composition that comprises water, a cement, a gas, and an additive, the additive comprising an anionic foaming agent and an anionic foam stabilizer; placing the cement composition into the subterranean formation; and allowing the cement composition to set therein. In some embodiments, the additive further may comprise a Zwitterionic foam booster.

In another embodiment, the present invention provides a method of cementing in a subterranean formation that comprises providing a foamed cement composition that comprises water, a cement, a gas, and an additive, the additive comprising a Zwitterionic foam booster and an anionic foam stabilizer; placing the cement composition into the subterranean formation; and allowing the cement composition to set therein. In some embodiments, the additive further may comprise an anionic foaming agent.

In another embodiment, the present invention provides a method of reducing the density of a cement composition that comprises providing a cement composition that comprises water and a cement; adding an additive to the cement composition, the additive comprising an anionic foaming agent and an anionic foam stabilizer; and adding a gas composition to the cement composition. In some embodiments, the additive further may comprise a Zwitterionic foam booster.

In another embodiment, the present invention provides a method of reducing the density of a cement composition that comprises providing a cement composition that comprises water and a cement; adding an additive to the cement composition, the additive comprising a Zwitterionic foam booster and an anionic foam stabilizer; and adding a gas to the cement composition. In some embodiments, the additive further may comprise an anionic foaming agent.

In another embodiment the present invention provides a foamed cement composition that comprises water, a cement, a gas, and an additive, the additive comprising an anionic foaming agent and an anionic foam stabilizer. In some embodiments, the additive further may comprise a Zwitterionic foam booster.

In another embodiment the present invention provides a foamed cement composition that comprises water, a cement, a gas, and an additive, the additive comprising a Zwitterionic foam booster and an anionic foam stabilizer. In some embodiments, the additive further may comprise an anionic foaming agent.

In another embodiment, the present invention provides an additive for foaming and stabilizing a cement composition that comprises an anionic foaming agent and an anionic foam stabilizer. In some embodiments, the additive further may comprise a Zwitterionic foam booster.

In yet another embodiment, the present invention provides an additive for foaming and stabilizing a cement composition that comprises a Zwitterionic foam booster and an anionic foam stabilizer. In some embodiments, the additive further may comprise an anionic foaming agent.

The features and advantages of the present invention will be readily apparent to those skilled in the art upon a reading of the description of the specific embodiments that follows.

DESCRIPTION

The present invention relates to subterranean cementing operations and associated methods, and more particularly, to foamed cement compositions that comprise an additive, the additive comprising an anionic foam stabilizer and at least one of an anionic foaming agent or a Zwitterionic foam booster.

The foamed cement compositions of the present invention generally comprise water, a cement, a gas, and an additive of the present invention. Generally, the additive of the present invention comprises an anionic foam stabilizer and at least one of an anionic foaming agent or a Zwitterionic foam booster. In one embodiment, the additive of the present invention comprises an anionic foam stabilizer and an anionic foaming agent. In another embodiment, the additive of the present invention comprises an anionic foam stabilizer and a Zwitterionic foam booster. In yet another embodiment, the additive of the present invention comprises an anionic foam stabilizer, an anionic foaming agent, and a Zwitterionic foam booster.

Generally, the foamed cement compositions of the present invention may have a density sufficient for a particular application as desired by one of ordinary skill in the art. In some embodiments, the foamed cement compositions of the present invention have a density in the range of from about 2 pounds per gallon ("ppg") to about 20 ppg. In certain embodiments, the foamed cement compositions of the present invention may have a density in the range of from about 10 ppg to about 15 ppg.

The water utilized in the foamed cement compositions of the present invention may be fresh water, saltwater (e.g., water containing one or more salts dissolved therein), brine (e.g., saturated saltwater), seawater, or combinations thereof. Generally, the water may be from any source provided that it does not contain an excess of compounds (e.g., dissolved organics) that may adversely affect a foamed cement composition of the present invention. Further, the water may be present in an amount sufficient to form a pumpable slurry. In certain embodiments, the water may be present in the foamed cement compositions of the present invention in an amount in the range of from about 16% to about 200% by weight of the cement ("bwoc") therein. In certain embodiments, the water may be present in the foamed cement compositions of the present invention in an amount in the range of from about 25% to about 90% bwoc therein. In certain embodiments, the water may be present in the foamed cement compositions of the present invention in an amount in the range of from about 28% to about 45% bwoc therein. One of ordinary skill in the art, with the benefit of this disclosure, will recognize the appropriate amount of water for a chosen application.

Any cements suitable for use in subterranean applications may be suitable for use in the present invention. In certain embodiments, the foamed cement compositions of the present invention comprise a hydraulic cement. A variety of hydraulic cements may be suitable for use, including those comprising calcium, aluminum, silicon, oxygen, and/or sulfur, which set and harden by reaction with water. Such hydraulic cements include, but are not limited to, Portland cements, pozzolanic cements, gypsum cements, soil cements, calcium phosphate cements, high alumina content cements, silica cements, high alkalinity cements, and mixtures thereof.

The gas utilized in the foamed cement compositions of the present invention may be any gas suitable for foaming a cement composition, including, but not limited to, air or nitrogen. Generally, the gas should be present in the foamed cement compositions of the present invention in an amount sufficient to form a foam. In certain embodiments, the gas may be present in the foamed cement compositions of the present invention in an amount in the range of form about 5% to about 55% by volume of the foamed cement composition therein at atmospheric pressure. In another embodiment, the gas may be present in the foamed cement compositions of the present invention in an amount in the range of form about 15% to about 30% by volume of the foamed cement composition therein at atmospheric pressure.

The foamed cement compositions of the present invention also include an additive of the present invention, the additive comprising an anionic foam stabilizer and at least one of an anionic foaming agent or a Zwitterionic foam booster. Among other things, the additive of the present invention should facilitate the foaming of a non-foamed cement slurry and also act to stabilize the foamed cement composition formed therewith. In one embodiment, the additive of the present invention comprises an anionic foam stabilizer and an anionic foaming agent. In another embodiment, the additive of the present invention comprises an anionic foam stabilizer and a Zwitterionic foam booster. In yet another embodiment, the additive of the present invention comprises an anionic foam stabilizer, an anionic foaming agent, and a Zwitterionic foam booster.

Generally, the additive of the present invention may be present in the foamed cement compositions in a sufficient amount to foam and stabilize a foamed cement composition of the present invention. In some embodiments, the additive of the present invention may be present in the foamed cement compositions of the present invention in an amount in the range of from about 0.01% to about 5% by volume of the water ("bvow") therein. In certain embodiments, the additive of the present invention may be present in the foamed cement compositions of the present invention in an amount in the range of from about 0.5% to about 2% bvow therein.

The anionic foam stabilizer suitable for use in the additives of the present invention may be any anionic foam stabilizer capable of stabilizing a foamed cement composition, e.g., by preventing components therein from separating and preventing foam break, that does not aversely affect other components of a foamed cement composition of the present invention. Examples of suitable anionic foam stabilizers include fatty methyl ester surfactants and aliphatic alkyl sulfonate or sulfate surfactants having an alkyl chain length of from about 16 to about 22 carbons. Examples of suitable fatty methyl ester surfactants include, but are not limited to, a fatty methyl ester sulfonate ("MES") surfactant. Commercially available examples of suitable anionic foam stabilizers include, but are not limited to, a palm oil MES from Huish Detergents, Inc., Salt Lake City, Utah; a fatty MES from Lion Chemicals, Tokyo, Japan; and MES from Baker Petrolite, Sugarland, Tex. The anionic foam stabilizer is typically present in the additives of the present invention in an amount in the range of from about 0.01% to about 90% by weight of the additive. In certain embodiments, the anionic foam stabilizer may be present in the additives of the present invention in an amount in the range of from about 0.1% to about 20% by weight of the additive. Inclusion of larger amounts of the anionic foam stabilizer in relation to the other components of the additive of the present invention may have a dispersing effect on a foamed cement composition of the present invention. For example, inclusion of the anionic foam stabilizer in an additive of the present invention in an anionic foaming agent-to-Zwitterionic foam booster-to-anionic foam stabilizer weight ratio of up to about 2:1:1 may have a dispersing effect on a foamed cement composition of the present invention. One of ordinary skill in the art should be able to determine the appropriate amount of the anionic foam stabilizer to include in an additive of the present invention for a particular application.

The anionic foaming agent suitable for use in the additives of the present invention may be any anionically charged surfactant capable of foaming an aqueous-based fluid. Furthermore, the anionic foaming agent should not adversely affect other components in a foamed cement composition of the present invention. Examples of suitable anionic foaming agents include, but are not limited to, sulfate surfactants and sulfonate surfactants. In some embodiments, the sulfate surfactant may be an alkyl ether sulfate surfactant ("AES"). In certain of these embodiments, the alkyl ether sulfate surfactant may be an ethoxylated alcohol ether sulfate surfactant of Formula 3:

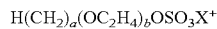

$$H(CH_2)_a(OC_2H_4)_bOSO_3X^+$$

wherein a is an integer in the range of from about 6 to about 14, b is an integer in the range of from about 3 to about 10, and X is any compatible cation. In other embodiments, the sulfonate surfactant may be an alpha-olefinic sulfonate ("AOS") surfactant. In certain of these embodiments, the alpha-olefinic sulfonate surfactant may be of Formula 4:

$$H(CH_2)_n-CH=CH-(CH_2)_mSO_3X^+$$

wherein n is an integer in the range of from about 3 to about 12, m is an integer in the range of from about 3 to about 12, and X is any compatible cation. An example of a suitable AOS surfactant is commercially available as "WITCONATE™" foamer from Akzo Nobel, Stratford, Conn. Examples of suitable AES surfactants are commercially available as "SULFO-CHEM®" alkyl ether sulfates from Chemron, Paso Robles, Calif. Where present, the anionic foaming agent may be present in the additives of the present invention in an amount in the range of from about 0.01% to about 90% by weight of the additive. In certain embodiments, the anionic foaming agent may be present in the additives of the present invention in an amount in the range of from about 30% to about 70% by weight of the additive.

The Zwitterionic booster suitable for use in the additives of the present invention may be any Zwitterionic surfactant capable of foaming an aqueous-based liquid. Furthermore, the Zwitterionic booster should not adversely affect other components in a foamed cement composition of the present invention. Examples of suitable Zwitterionic boosters include, but are not limited to, betaine surfactants, sulfobetaine surfactants, amphopropionate surfactants, and glycinate surfactants. In certain embodiments, the betaine surfactant is a fatty betaine surfactant. In one embodiment, the Zwitterionic booster comprises an alkyl or alkene amidopropyl betaine surfactant of Formula 5:

$$R-CONHCH_2CH_2CH_2N^+(CH_3)_2CH_2COO^-$$

wherein R is an alkyl chain of from about 6 to about 18 carbons or mixtures thereof. Examples of suitable Zwitterionic boosters of Formula 5 include, cocoylamidopropylbetaine, lauroylamidopropoylbetaine, and myristoylamidopropylbetaine. Where present, the Zwitterionic booster may be present in the additives of the present invention in an amount in the range of from about 0.01% to about 90% by weight of the additive. In certain embodiments, the Zwitterionic booster may be present in the additives of the present invention in an amount in the range of from about 5% to about 50% by weight of the additive.

To facilitate mixing with the other components of the foamed cement composition, the additive of the present invention may be further comprise a base fluid. The base fluid may be any surfactant solubilizer, such as water, simple alcohols, or mixtures thereof, capable of solubilizing the above-described components of the additive.

Optionally, other additional additives may be added to the foamed cement compositions of the present invention as deemed appropriate by one skilled in the art, with the benefit of this disclosure. Examples of such additives include, but are not limited to, lost circulation materials, fly ash, silica compounds, fluid loss control additives, dispersants, accelerators, retarders, salts, mica, sand, fibers, formation conditioning agents, fumed silica, bentonite, microspheres, weighting materials, and the like.

The foamed cement compositions of the present invention may be prepared in accordance with any suitable technique. In some embodiments, the desired quantity of water may be introduced into a cement blender followed by the cement component of the foamed cement compositions. Additional liquid additives, if any, may be added to the water as desired prior to addition of the cement therewith, and additional solid additives, if any, may be added to the water and cement, as desired, prior to mixing. This mixture may agitated for a sufficient period of time to form a pumpable non-foamed slurry. This non-foamed slurry may then be pumped to the well bore, and an additive of the present invention comprising an anionic foam stabilizer and at least one of an anionic foaming agent or a Zwitterionic foam booster may be metered into the non-foamed followed by injection of a gas in an amount sufficient to foam the slurry thereby forming a foamed slurry, a foamed cement composition of the present invention. After foaming, the foamed cement composition of the present invention, may be placed into a desired location within the well bore and allowed to set therein.

In one embodiment, the present invention provides a method of cementing in a subterranean formation that comprises providing a foamed cement composition that comprises water, a cement, a gas, and an additive, the additive comprising an anionic foaming agent and an anionic foam stabilizer; placing the cement composition into the subterranean formation; and allowing the cement composition to set therein. In some embodiments, the additive further may comprise a Zwitterionic foam booster.

In another embodiment, the present invention provides a method of cementing in a subterranean formation that comprises providing a foamed cement composition that comprises water, a cement, a gas, and an additive, the additive comprising a Zwitterionic foam booster and an anionic foam stabilizer; placing the cement composition into the subterranean formation; and allowing the cement composition to set therein. In some embodiments, the additive further may comprise an anionic foaming agent.

In another embodiment, the present invention provides a method of reducing the density of a cement composition that comprises providing a cement composition that comprises

water and a cement; adding an additive to the cement composition, the additive comprising an anionic foaming agent and an anionic foam stabilizer; and adding a gas composition to the cement composition. In some embodiments, the additive further may comprise a Zwitterionic foam booster.

In another embodiment, the present invention provides a method of reducing the density of a cement composition that comprises providing a cement composition that comprises water and a cement; adding an additive to the cement composition, the additive comprising a Zwitterionic foam booster and an anionic foam stabilizer; and adding a gas to the cement composition. In some embodiments, the additive further may comprise an anionic foaming agent.

In another embodiment the present invention provides a foamed cement composition that comprises water, a cement, a gas, and an additive, the additive comprising an anionic foaming agent and an anionic foam stabilizer. In some embodiments, the additive further may comprise a Zwitterionic foam booster.

In another embodiment the present invention provides a foamed cement composition that comprises water, a cement, a gas, and an additive, the additive comprising a Zwitterionic foam booster and an anionic foam stabilizer. In some embodiments, the additive further may comprise an anionic foaming agent.

In another embodiment, the present invention provides an additive for foaming and stabilizing a cement composition that comprises an anionic foaming agent and an anionic foam stabilizer. In some embodiments, the additive further may comprise a Zwitterionic foam booster. An example of an additive of the present invention comprises a base fluid, about 38% of an alkyl ether sulfate or an alpha-olefinic sulfonate by weight, about 7.5% to about 8% of a fatty betaine by weight, and about 7.5% to about 8% of a fatty methyl ester sulfonate by weight.

In yet another embodiment, the present invention provides an additive for foaming and stabilizing a cement composition that comprises a Zwitterionic foam booster and an anionic foam stabilizer. In some embodiments, the additive further may comprise an anionic foaming agent.

To facilitate a better understanding of the present invention, the following examples of specific embodiments are given. In no way should the following examples be read to limit, or to define, the scope of the invention.

EXAMPLE 1

Test samples were prepared that comprised fresh water, Class G cement, and air. For each test sample, an unfoamed cement composition having a density of about 15.8 ppg was first prepared by combining the fresh water and the cement utilizing a mixing device. Predetermined amounts of the resultant unfoamed cement composition were then placed in fixed volume blender jars adapted for receiving a stacked blade assembly. Next, either an additive of the present invention or a comparative additive consisting of mixtures of foaming agents and/or foam stabilizers were added in an amount of 2% bvow, unless otherwise noted. The formulation of the additives of the present invention and the comparative additive are provided in Table 1, below, with the remainder being a base fluid.

TABLE 1

| | Additive | | | |
|---|---|---|---|---|
| Sample No. | AOS (% by weight) | AES (% by weight) | Betaine[1] (% by weight) | MES (% by weight) |
| 1 (comparative) | 60 | Not present. | Not present. | Not present. |
| 2 | 54 | Not present. | Not present. | 11 |
| 3 | 46 | Not present. | Not present. | 23 |
| 4 (comparative) | 41 | Not present. | 8 | Not present. |
| 5 (comparative) | 27 | Not present. | 14 | Not present. |
| 6 (comparative) | Not present. | Not present. | 25 | Not present. |
| 7 | Not present. | Not present. | 24 | 5 |
| 8 | Not present. | Not present. | 22 | 11 |
| 9 (comparative) | Not present. | 60 | Not present. | Not present. |
| 10 | Not present. | 54 | Not present. | 11 |
| 11 | Not present. | 46 | Not present. | 23 |
| 12 (comparative) | Not present. | 41 | 8 | Not present. |
| 13 (comparative) | Not present. | 27 | 14 | Not present. |
| 14 | 38 | Not present. | 8 | 8 |
| 15 | 24 | Not present. | 12 | 12 |
| 16 | Not present. | 38 | 8 | 8 |
| 17 | Not present. | 24 | 12 | 12 |
| 18 | Not present. | 38 | 8 | 8 |
| 19 | Not present. | 24 | 12 | 12 |

[1] A cocoylamidopropyl betaine was used.

After addition of the additives of the present invention or the comparative additives to the unfoamed cement compositions in the jars, the contents were mixed at high speed. The high speed mixing by the stacked blade assembly caused each slurry to be foamed with air. The density of the foamed samples, time required to form a foam, and additive added thereto are provided in Table 2, below.

The foamed test samples were then allowed to set for 24 hours at 150° F. and atmospheric pressure after which they were subjected to compressive strength tests in with API Specification for Materials and Testing of Well Cement, *API Specification* 10, Twenty-Third Edition, dated April 2002. In addition, sectional densities of the resultant set foamed test sample taken, resulting in a top, middle, and bottom density. The results of the testing are set forth in Table 2 below. Unless otherwise noted, where a compressive strength or sectional density is not listed, the foamed test sample did not have sufficient properties to perform the necessary tests.

TABLE 2

| Sample No. | Additive | Foam Time (sec) | Section | Density (ppg) | Foamed Sample Density (ppg) | 24 Hour Compressive Strength at 150° F. (psi) |
|---|---|---|---|---|---|---|
| 1 (comparative) | AOS | 10 | Top Middle Bottom | 10.87 10.83 9.91 | 10.2 | 414 |
| 2 | 5:1, AOS:MES | 10 | Top Middle Bottom | 10.26 9.76 9.17 | 10.5 | 433 |
| 3 | 2:1, AOS:MES | 10 | Top Middle Bottom | 10.12 9.71 9.73 | 10.3 | 544 |
| 4 (comparative) | 5:1, AOS:Betaine | 5 | Top Middle Bottom | 10.56 10.43 10.51 | 11.4 | 1438 |
| 5 (comparative) | 2:1, AOS:Betaine | 5 | Top Middle Bottom | 10.27 10.29 10.57 | 11.34 | 1126 |
| 6 (comparative) | Betaine | 7 | Top Middle Bottom | 10.5 10.62 10.13 | 11.03 | 952 |
| 7 | 5:1, Betaine:MES | 5 | Top Middle Bottom | 9.21 9.38 9.83 | 10.7 | 974 |
| 8 | 2:1, Betaine:MES | 5 | Top Middle Bottom | 11.26 11.22 10.85 | 11.3 | 889 |
| 9 (comparative) | AES | 5 | Top Middle Bottom | 9.97 8.84 8.65 | 10.06 | 281 |
| 10 | 5:1, AES:MES | 5 | Top Middle Bottom | 9.83 8.91 8.81 | 10.03 | 535 |
| 11 | 2:1, AES:MES | 5 | Top Middle Bottom | 8.85 8.66 8.49 | 10.01 | 691 |
| 12 (comparative) | 5:1, AES:Betaine | 5 | Top Middle Bottom | 8.85 8.66 8.49 | 10.22 | 422 |
| 13 (comparative) | 2:1, AES:Betaine | <5 | Top Middle Bottom | 10.16 9.89 9.80 | 10.93 | 1010 |
| 14 | 5:1:1, AOS:Betaine:MES | 5 | Top Middle Bottom | 10.42 10.19 10.31 | 11.08 | 1442 |
| 15 | 2:1:1 AOS:Betaine:MES | 5 | Top Middle Bottom | 9.59 9.63 9.63 | 11.53 | 1058 |
| 16 | 5:1:1 AES:Betaine:MES | <5 | Top Middle Bottom | 9.7 9.63 9.49 | 10.6 | 756 |
| 17 | 2:1:1 AES:Betaine:MES | <5 | Top Middle Bottom | — — — | 10.49 | — |
| 18[1] | 5:1:1 AES:Betaine:MES | <10 | Top Middle Bottom | — — — | 10.4 | — |
| 19[2] | 2:1:1 AES:Betaine:MES | <10 | Top Middle Bottom | — — — | 10.8 | 1185 |

[1] The additive of the present invention was included in Sample No. 18 in an amount of 0.2% bvow.
[2] The additive of the present invention was included in Sample No. 19 in an amount of 0.5% bvow.

The above example demonstrates, inter alia, that foamed cement compositions of the present invention that comprise fresh water and an additive of the present invention are suitable for use in subterranean operations.

EXAMPLE 2

Test samples were prepared that comprised saturated saltwater, Class G cement, and air. For each test sample, an unfoamed cement composition having a density of about 17.5 ppg was first prepared by combining the saltwater and the cement utilizing a mixing device. Predetermined amounts of the resultant unfoamed cement composition were then placed in fixed volume blender jars adapted for receiving a stacked blade assembly. Next, either an additive of the present invention or a comparative additive consisting of mixtures of foaming agents and/or foam stabilizers were added in an amount of 3% bvow, unless otherwise noted. The formulation of the additives of the present invention and the comparative additives are provided in Table 3, below, with the remainder being a base fluid.

TABLE 3

| Sample No. | Additive | | | |
|---|---|---|---|---|
| | AOS (by weight) | AES (by weight) | Betaine[1] (by weight) | MES (by weight) |
| 20 (comparative) | 60 | Not present. | Not present. | Not present. |
| 21 | 54 | Not present. | Not present. | 11 |
| 22 | 46 | Not present. | Not present. | 23 |
| 23 (comparative) | 41 | Not present. | 8 | Not present. |
| 24 (comparative) | 27 | Not present. | 14 | Not present. |
| 25 (comparative) | Not present. | Not present. | 25 | Not present. |
| 26 | Not present. | Not present. | 24 | 5 |
| 27 | Not present. | Not present. | 22 | 11 |
| 28 (comparative) | Not present. | 60 | Not present. | Not present. |
| 29 | Not present. | 54 | Not present. | 11 |
| 30 | Not present. | 46 | Not present. | 23 |
| 31 (comparative) | Not present. | 41 | 8 | Not present. |
| 32 (comparative) | Not present. | 27 | 14 | Not present. |
| 33 | 38 | Not present. | 8 | 8 |
| 34 | 24 | Not present. | 12 | 12 |
| 35 | Not present. | 38 | 8 | 8 |
| 36 | Not present. | 24 | 12 | 12 |
| 37[2] (comparative) | N/A | N/A | N/A | N/A |

[1] A cocoylamidopropylbetaine was used.
[2] The prior art additive included in Sample No. 37 was "ZONESEALANT ™ 2000", commercially available from Halliburton Energy Services, Duncan, Oklahoma, that comprised an alkyl ether sulfate, a betaine, and an amine oxide in a weight ratio of about 15:4:1.

After addition of the additives of the present invention or the comparative additives to the unfoamed cement compositions in the jars, the contents were mixed at high speed. The high speed mixing by the stacked blade assembly caused each slurry to be foamed with air. The density of the foamed samples, time required to form a foam, and additive added thereto are provided in Table 4, below.

The foamed test samples were then allowed to set for 24 hours at 150° F. and atmospheric pressure after which they were subjected to compressive strength tests in accordance with API Specification for Materials and Testing of Well Cement, *API Specification* 10, Twenty-Third Edition, dated April 2002. In addition, sectional densities of the resultant set foamed test sample taken, resulting in a top, middle, and bottom density. The results of the testing are set forth in Table 4 below. Unless otherwise noted, where a compressive strength or sectional density is not listed, the foamed test sample did not have sufficient properties to perform the necessary tests.

TABLE 4

| Sample No. | Additive | Foam Time (sec) | Section | Density (ppg) | Foamed Sample Density (ppg) | 24 Hour Compressive Strength at 150° F. (psi) |
|---|---|---|---|---|---|---|
| 20 (comparative) | AOS | 45 | Top | 15.31 | 15.4 | 2280[1] |
| | | | Middle | 15.33 | | |
| | | | Bottom | 15.63 | | |
| 21 | 5:1, AOS:MES | 45 | Top | 14.17 | 14.96 | 1444 |
| | | | Middle | 14.25 | | |
| | | | Bottom | 14.34 | | |
| 22 | 2:1, AOS:MES | 45 | Top | 11.72 | 12.8 | 730 |
| | | | Middle | 11.75 | | |
| | | | Bottom | 11.86 | | |
| 23 (comparative) | 5:1, AOS:Betaine | 45 | Top | 14.54 | 15.06 | N/A[2] |
| | | | Middle | 14.42 | | |
| | | | Bottom | 14.46 | | |
| 24 (comparative) | 2:1, AOS:Betaine | 45 | Top | 14.22 | 14.89 | 1946 |
| | | | Middle | 14.14 | | |
| | | | Bottom | 14.27 | | |
| 25 (comparative) | Betaine | 45 | Top | 12.91 | 13.9 | 1197 |
| | | | Middle | 12.91 | | |
| | | | Bottom | 13.12 | | |
| 26 | 5:1, Betaine:MES | 45 | Top | 12.58 | 13.1 | 957 |
| | | | Middle | 12.50 | | |
| | | | Bottom | 12.08 | | |
| 27 | 2:1, Betaine:MES | 45 | Top | 11.63 | 12.7 | 734 |
| | | | Middle | 11.50 | | |
| | | | Bottom | 11.34 | | |
| 28 (comparative) | AES | 45 | Top | 10.74 | 11.86 | 504 |
| | | | Middle | 10.56 | | |
| | | | Bottom | 10.39 | | |

TABLE 4-continued

| Sample No. | Additive | Foam Time (sec) | Section | Density (ppg) | Foamed Sample Density (ppg) | 24 Hour Compressive Strength at 150° F. (psi) |
|---|---|---|---|---|---|---|
| 29 | 5:1, AES:MES | 45 | Top Middle Bottom | 11.56 11.50 11.25 | 12.56 | 601 |
| 30 | 2:1, AES:MES | 45 | Top Middle Bottom | 11.88 11.83 11.58 | 12.85 | 752 |
| 31 (comparative) | 5:1, AES:Betaine | 45 | Top Middle Bottom | 11.34 11.14 11.15 | 12.13 | 809 |
| 32 (comparative) | 2:1, AES:Betaine | 45 | Top Middle Bottom | 11.56 11.24 11.17 | 12.11 | 855 |
| 33 | 5:1:1, AOS:Betaine:MES | 45 | Top Middle Bottom | 14.37 14.42 14.59 | 15.2 | 2230 |
| 34 | 2:1:1 AOS:Betaine:MES | 45 | Top Middle Bottom | 13.41 13.29 13.36 | 13.98 | 1304 |
| 35 | 5:1:1 AES:Betaine:MES | 45 | Top Middle Bottom | 11.85 11.71 12.01 | 12.90 | 953 |
| 36 | 2:1:1 AES:Betaine:MES | 45 | Top Middle Bottom | — — — | 12.42 | — |
| 37 (comparative) | 15:4:1 AES:Betaine: Amine Oxide | 45 | Top Middle Bottom | 12.03 11.79 11.71 | 12.74 | 966 |

[1]The 48 hour compressive strength at 150° F.
[2]While the foamed test sample had sufficient properties to perform a compressive strength test, one was not performed.

The above example demonstrates, inter alia, that foamed cement compositions of the present invention that comprise saltwater and an additive of the present invention are suitable for use in subterranean operations.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of reducing the density of a well cement composition comprising:
   providing the well cement composition comprising water and a cement;
   adding an additive to the well cement composition, the additive comprising an anionic foaming agent and an anionic foam stabilizer; and
   adding a gas to the well cement composition.

2. The method of claim 1 wherein the anionic foam stabilizer comprises at least one surfactant selected from the group consisting of a fatty methyl ester surfactant, an aliphatic alkyl sulfonate surfactant having an alkyl chain length of from about 16 to about 22 carbons, an aliphatic alkyl sulfate surfactant having an alkyl chain length of from about 16 to about 22 carbons, and combinations thereof.

3. The method of claim 1 wherein the anionic foaming agent comprises at least one surfactant selected from the group consisting of a sulfate surfactant, a sulfonate surfactant, and combinations thereof.

4. The method of claim 1 wherein the additive comprises a Zwitterionic foam booster, selected from the group consisting of a betaine surfactant, a sulfobetaine surfactant, an amphopropionate surfactant, a glycinate surfactant, and combinations thereof.

5. A method of reducing the density of a well cement composition comprising:
   providing the well cement composition comprising water and cement;
   adding an additive to the well cement composition, the additive comprising a Zwitterionic foam booster and an anionic foam stabilizer, wherein the anionic foam stabilizer comprises at least one surfactant selected from the group consisting of a fatty methyl ester surfactant, an aliphatic alkyl sulfonate surfactant having an alkyl chain length of from about 16 to about 22 carbons, an aliphatic alkyl sulfate surfactant having an alkyl chain length of from about 16 to about 22 carbons, and combinations thereof; and
   adding a gas to the well cement composition.

6. The method of claim 5 wherein the Zwitterionic foam booster comprises at least one surfactant selected from the group consisting of a betaine surfactant, a sulfobetaine surfactant, an amphopropionate surfactant, a glycinate surfactant, and combinations thereof.

7. The method of claim 5 wherein the additive comprises an anionic foaming agent selected from the group consisting of an alkyl ether sulfate surfactant, an alpha-olefinic sulfonate surfactant, and combinations thereof.

8. A foamed well cement composition comprising water, a cement, a gas, and an additive, the additive comprising an anionic foaming agent and an anionic foam stabilizer.

9. The foamed well cement composition of claim 8 wherein the cement comprises a hydraulic cement.

10. The foamed well cement composition of claim 8 wherein the anionic foam stabilizer comprises at least one surfactant selected from the group consisting of a fatty methyl ester surfactant, an aliphatic alkyl sulfonate surfactant having an alkyl chain length of from about 16 to about 22 carbons, an aliphatic alkyl sulfate surfactant having an alkyl chain length of from about 16 to about 22 carbons, and combinations thereof.

11. The foamed well cement composition of claim 8 wherein the anionic foam stabilizer is present in the additive in an amount of from about 0.01% to about 20% by weight of the additive.

12. The foamed well cement composition of claim 8 wherein the anionic foaming agent comprises at least one surfactant selected from the group consisting of a sulfate surfactant, a sulfonate surfactant, an alkyl ether sulfate surfactant, an ethoxylated alcohol ether sulfate surfactant, an alpha-olefinic sulfonate surfactant, and combinations thereof.

13. The foamed well cement composition of claim 8 wherein the anionic foaming agent comprises an ethoxylated alcohol ether sulfate surfactant having the formula:

$$H(CH_2)_a(OC_2H_4)_b OSO_3^- X^+$$

wherein a is an integer in the range of from about 6 to about 14, b is an integer in the range of from about 3 to about 10, and X is any compatible cation.

14. The foamed well cement composition of claim 8 wherein the anionic foaming agent comprises and alpha-olefinic sulfonate surfactant having the formula:

$$H(CH_2)_n-CH=CH-(CH_2)_m SO_3^- X^+$$

wherein n is an integer in the range of from about 3 to about 12, m is an integer in the range of from about 3 to about 12, and X is any compatible cation.

15. The foamed well cement composition of claim 8 wherein the anionic foaming agent is present in the additive in an amount in the range of from about 30% to about 70% by weight of the additive.

16. The foamed well cement composition of claim 8 wherein the additive comprises a Zwitterionic foam booster.

17. The foamed well cement composition of claim 16 wherein the Zwitterionic foam booster comprises at least one surfactant selected from the group consisting of a betaine surfactant, a fatty betaine surfactant, a sulfobetaine surfactant, an amphopropionate surfactant, a glycinate surfactant, an alkyl or an alkene amidopropyl betaine surfactant, and combinations thereof.

18. The foamed well cement composition of claim 16 wherein the Zwitterionic foam booster comprises an alkyl or alkene amidopropyl betaine surfactant having the formula:

$$R-CONHCH_2CH_2CH_2N^+(CH_3)_2CH_2COO^-$$

wherein R is an alkyl or alkene chain of from about 6 to about 18 carbons or a mixture thereof.

19. The foamed well cement composition of claim 8 wherein the additive comprises a Zwitterionic foam booster, wherein the anionic foam stabilizer comprises a fatty methyl ester surfactant, and wherein the anionic foaming agent comprises an alkyl ether sulfate surfactant.

20. The foamed well cement composition of claim 8 wherein the additive comprises a Zwitterionic foam booster, wherein the anionic foam stabilizer comprises a fatty methyl ester surfactant, and wherein the anionic foaming agent comprises an alpha-olefinic surfactant.

21. A foamed well cement composition comprising water, a cement, a gas, and an additive, the additive comprising a Zwitterionic foam booster and an anionic foam stabilizer, wherein the anionic foam stabilizer comprises at least one surfactant selected from the group consisting of a fatty methyl ester surfactant, an aliphatic alkyl sulfonate surfactant having an alkyl chain length of from about 16 to about 22 carbons, an aliphatic alkyl sulfate surfactant having an alkyl chain length of from about 16 to about 22 carbons, and combinations thereof.

22. The foamed well cement composition of claim 21 wherein the Zwitterionic foam booster agent comprises at least one surfactant selected from the group consisting of a betaine surfactant, a sulfobetaine surfactant, an amphopropionate surfactant, a glycinate surfactant, and combinations thereof.

23. The foamed well cement composition of claim 21 wherein the additive comprises an anionic foaming agent selected from the group consisting of an alkyl ether sulfate surfactant, an alpha-olefinic sulfonate surfactant, and combinations thereof.

* * * * *